(12) United States Patent
Bruckner et al.

(10) Patent No.: US 8,381,090 B2
(45) Date of Patent: Feb. 19, 2013

(54) DYNAMIC EXPANSION OF DATA CALCULATION SCOPES

(75) Inventors: Robert Bruckner, Redmond, WA (US); Victor Arakcheev, Redmond, WA (US); Nader Nashed, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 12/687,944

(22) Filed: Jan. 15, 2010

(65) Prior Publication Data
US 2011/0179051 A1 Jul. 21, 2011

(51) Int. Cl.
G06F 17/00 (2006.01)
(52) U.S. Cl. .................................. 715/219; 707/737
(58) Field of Classification Search .................. 715/219; 707/737
See application file for complete search history.

(56) References Cited

U.S. PATENT DOCUMENTS

| | | | |
|---|---|---|---|
| 5,845,285 A | 12/1998 | Klein | |
| 2004/0194015 A1* | 9/2004 | Hays et al. | 715/501.1 |
| 2004/0194031 A1* | 9/2004 | Hays et al. | 715/530 |
| 2006/0294069 A1 | 12/2006 | Carlson et al. | |
| 2007/0226200 A1 | 9/2007 | Hays et al. | |
| 2008/0027957 A1* | 1/2008 | Bruckner et al. | 707/101 |
| 2008/0183726 A1 | 7/2008 | Bruckner et al. | |
| 2009/0248649 A1* | 10/2009 | Meek et al. | 707/4 |
| 2010/0223264 A1* | 9/2010 | Bruckner et al. | 707/737 |

OTHER PUBLICATIONS

"Report Definition Language Specification", Retrieved at <<http://download.microsoft.com/download/c/2/0/c2091a26-d7bf-4464-8535-dbc31fb45d3c/rdlNov05.pdf>>, Nov. 2005, pp. 121.
Litwin, Paul, "SQL Server Reporting Services Hits its Stride", Retrieved at <<http://www.code-magazine.com/Article.aspx?quickid=0909071>>, 1993-2009, pp. 5.
"Make an All Group to Display in Reporting Services Report", Retrieved at <<http://social.msdn.microsoft.com/Forums/en-US/sqlanalysisservices/thread/5ed6b356-eeec-422e-a056-a3216cf84c51>>, Jun. 9, 2009, pp. 2.
"Birt Report Object Model—Lists & Tables", Retrieved at <<http://www.eclipse.org/birt/refROM_List_and_Table_SPEC.pdf>>, Nov. 29, 2004, pp. 1-11.
"Advanced Ranking and Grouping with SQL Server Reporting Services (cont'd)", Retrieved at <<http://www.devx.com/dbzone/Article/37799/1763/page/3>>, Nov. 9, 2009, pp. 3.

* cited by examiner

*Primary Examiner* — Adam M Queler
*Assistant Examiner* — Howard Cortes
(74) *Attorney, Agent, or Firm* — Merchant & Gould PC

(57) ABSTRACT

Nested and grouped report data are aligned. A data-bound object such as a data region or an outer group serves as a data container having a domain scope. Instances of an inner group with misaligned data values are identified. The inner group instances are synchronized based on the data container domain scope, in response to a synchronization instruction in a report definition. During synchronization, data values are injected, and a synchronization group may be dynamically created. Aggregate functions are calculated over a synchronized group without regard to injected data values. A report layout is generated with synchronization visually indicated.

20 Claims, 6 Drawing Sheets

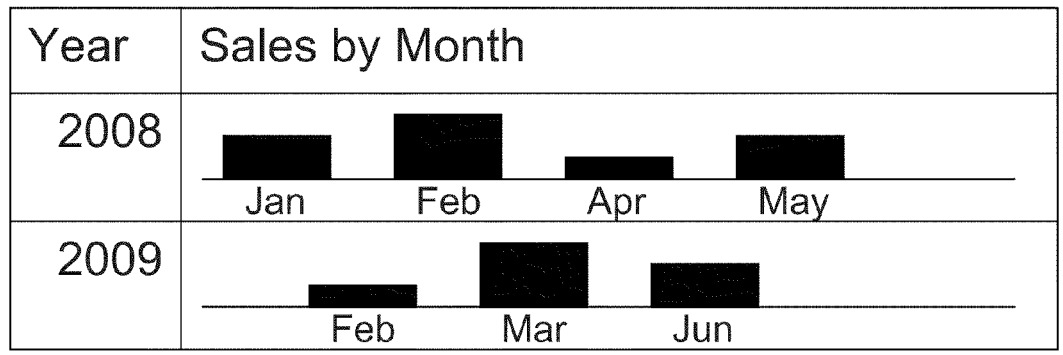
Fig. 4
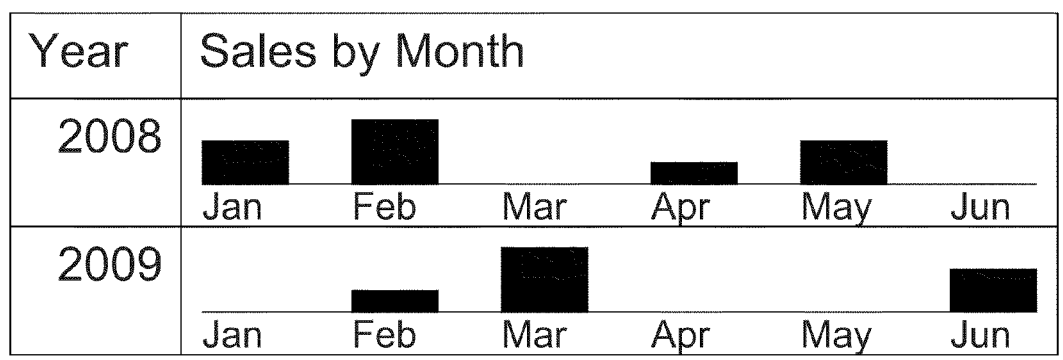
Fig. 5
| 2008 | Jan |
| | Feb |
| | Apr |
| | May |
| 2009 | Feb |
| | Mar |
| | Jun |
Fig. 6

| Country | Quarter | Sales | RowCount |
|---|---|---|---|
| US | Q2 | 279 | 15 |
|  | Q3 | 218 | 13 |
|  | Q4 | 387 | 23 |
| Canada | Q1 | 65 | 7 |
|  | Q4 | 14 | 2 |

Fig. 9

| Country | Quarter | Sales | RowCount |
|---|---|---|---|
| US | Q1 |  | 0 |
|  | Q2 | 279 | 15 |
|  | Q3 | 218 | 13 |
|  | Q4 | 387 | 23 |
| Canada | Q1 | 65 | 7 |
|  | Q2 |  | 0 |
|  | Q3 |  | 0 |
|  | Q4 | 14 | 2 |

Fig. 10

DYNAMIC EXPANSION OF DATA CALCULATION SCOPES

BACKGROUND

Modern businesses, institutions, agencies, and other entities use software to help generate reports on which decisions are based. A report definition guides or influences data selection, layout, statistical calculations, and other computational processing, to help present data from a database or other data source in a form that helps decision makers.

Some report definitions include facilities for grouping data. Within data-oriented applications such as some query and reporting tools, for example, data can be grouped before being displayed to the user in a report. Grouping of data can serve purposes such as clustering related data, subtotaling, and identification or removal of duplicate data. Grouping can be performed over a single data field, such as grouping a list of customers by state. Grouping can also be performed over multiple nested data fields, such as grouping a list of customers by state and then within each state grouping the customers by gender.

SUMMARY

When data is grouped in a nested way, inner group instances within a particular outer group instance might not be aligned to the instances within the sibling(s) of the outer group. For example, the data for a particular year may have no entries for January, while for another year entries for March are missing. Some embodiments described herein align data to show empty entries for the missing month(s) within all years, and make similar adjustments with other types of missing data values, to help make reports easier to understand.

For example, some embodiments obtain a report definition, and locate in the report definition (i) a data-bound object definition defining a data container having a domain scope, and (ii) an inner group definition defining an inner group nested within the data container. As examples, the data-bound object definition may define a data region, or an outer group. Instances of the inner group differing in at least one data value are identified. The inner group instances are synchronized based on the data container domain scope, in response to a synchronization instruction in the report definition. During synchronization, data values may be injected, and/or a new synchronization group may be dynamically created. Aggregate functions may be calculated over a synchronized group without regard to injected data values. A report layout is generated, in which alignment from synchronization based on the data container domain scope is visually indicated.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a sample unsynchronized report layout visualization, in which sibling instances of an inner group Month are not aligned;

FIG. 5 is a synchronized report layout visualization of data from FIG. 4, in which sibling group instances are aligned;

FIG. 6 is a block diagram illustrating the unsynchronized outer group and inner group instances of the FIG. 4 example;

FIG. 9 is a sample unsynchronized report layout visualization including an aggregate function RowCount, in which sibling instances of an inner group Quarter are not aligned; and FIG. 10 is a synchronized report layout visualization of data from FIG. 9, in which sibling group instances are aligned.

DETAILED DESCRIPTION

Overview

Generally speaking, nested and grouped report data can be aligned to make reports easier to understand. Toward that end, a data-bound object such as a data region or an outer group can serve as a data container having a domain scope. Instances of an inner group with misaligned data values are identified. The inner group instances are synchronized based on the data container domain scope, in response to a synchronization instruction in a report definition. During synchronization, data values are injected where they were missing, and a synchronization group may be dynamically created. Aggregate functions such as statistical functions are calculated over a synchronized group's instances without regard to injected data values—visual alignment need not alter the substantive numeric results presented in a report. A report layout is generated, containing aligned items; the synchronization is visually indicated in a visualization of the report.

Specifically, when the data for a report is grouped in a nested way, the inner group instances (e.g., genders within cities) within a particular outer group instance (e.g., the cities) may not be aligned to the instances within the sibling(s) of the outer group, even though it would be helpful to synchronize them when reporting the data. For example, the data could be grouped by year then by month, and for a particular year the data may have no entries for January, while for another year there are entries missing for March. When reporting the data within a matrix or chart, it could be helpful to align the data in a way that shows empty entries for the missing month(s) within all years as needed to aid legibility. Alignment may be particularly helpful for visual display of data, where side-by-side comparison is difficult when different instances of the outer group do not have aligned instances of the inner groups.

Figure 7:
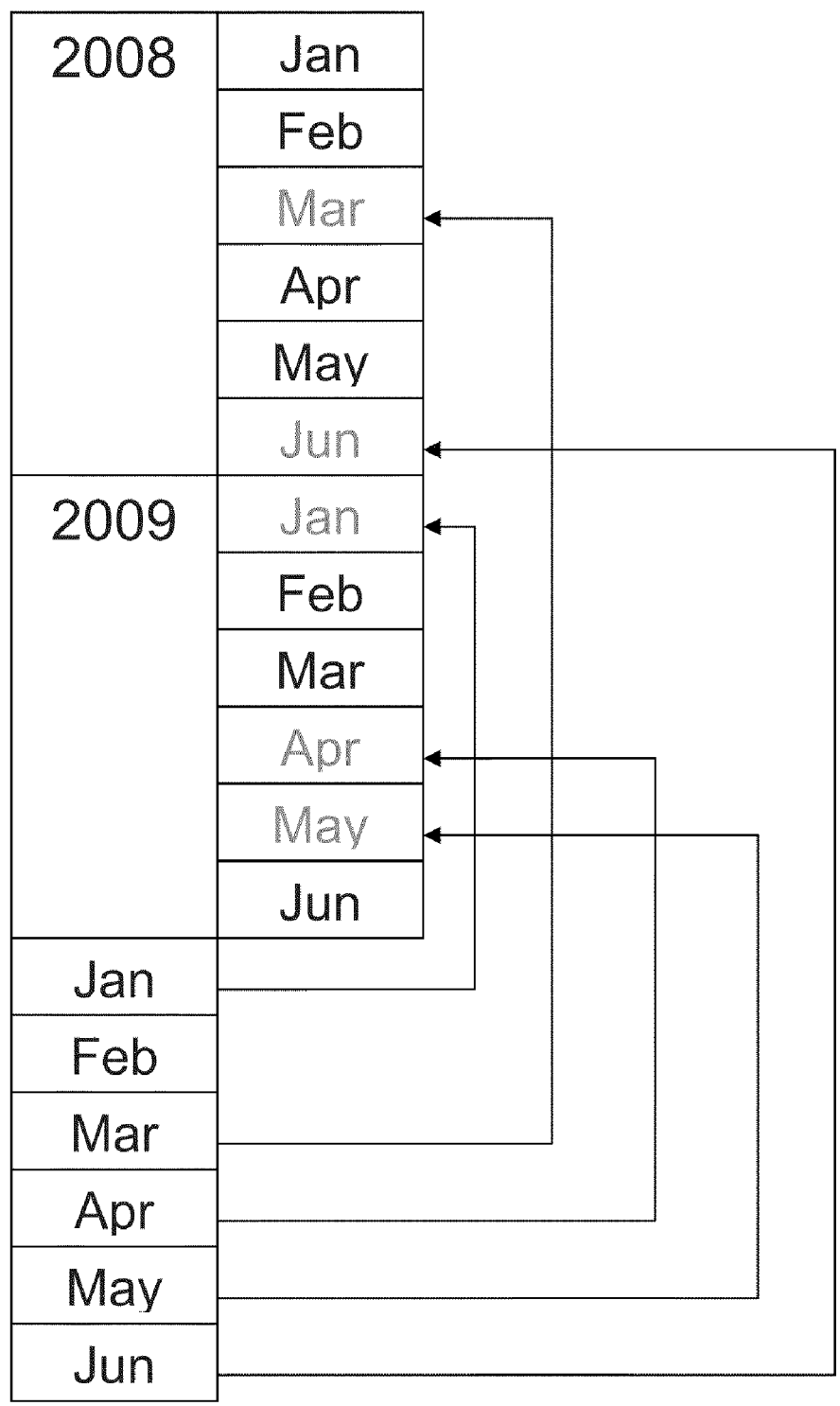
FIG. 7 is a block diagram illustrating the synchronized outer group and inner groups of the FIG. 5 example, showing injected group data values.

For example, FIG. 4 shows a chart that groups data by year and month. The chart is not aligned, which makes the comparison between the years difficult. In FIG. 5, by contrast, the chart is aligned using inserted months and whitespace, making comparison between years much easier. FIG. 6 shows data values present in the FIG. 4 data. FIG. 7 shows an injection of data values into groups 2008 and 2009, to fill in gaps due to missing values. The alignment shown in FIG. 5, and similar data alignments, can be achieved using dynamic expansion of data calculation scope tools and techniques described herein.

Some embodiments described herein dynamically create a hidden group under a specified scope, based on which all instances of a given inner group should be synchronized. After the instances of the hidden group are generated, they are used to inject the missing instances within the inner group. A synchronization instruction to specify alignment domain scope can be expressed in a declarative way, such as in a report definition. In particular, a synchronization instruction can be expressed in some embodiments in a report definition. In some embodiments which comport with the Report Definition Language ("RDL") standard proposed by Microsoft Corporation, for example, a synchronization instruction can take the form of a Group.DomainScope element in an XML schema defining a report.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "processor(s)" means "one or more processors" or equivalently "at least one processor".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
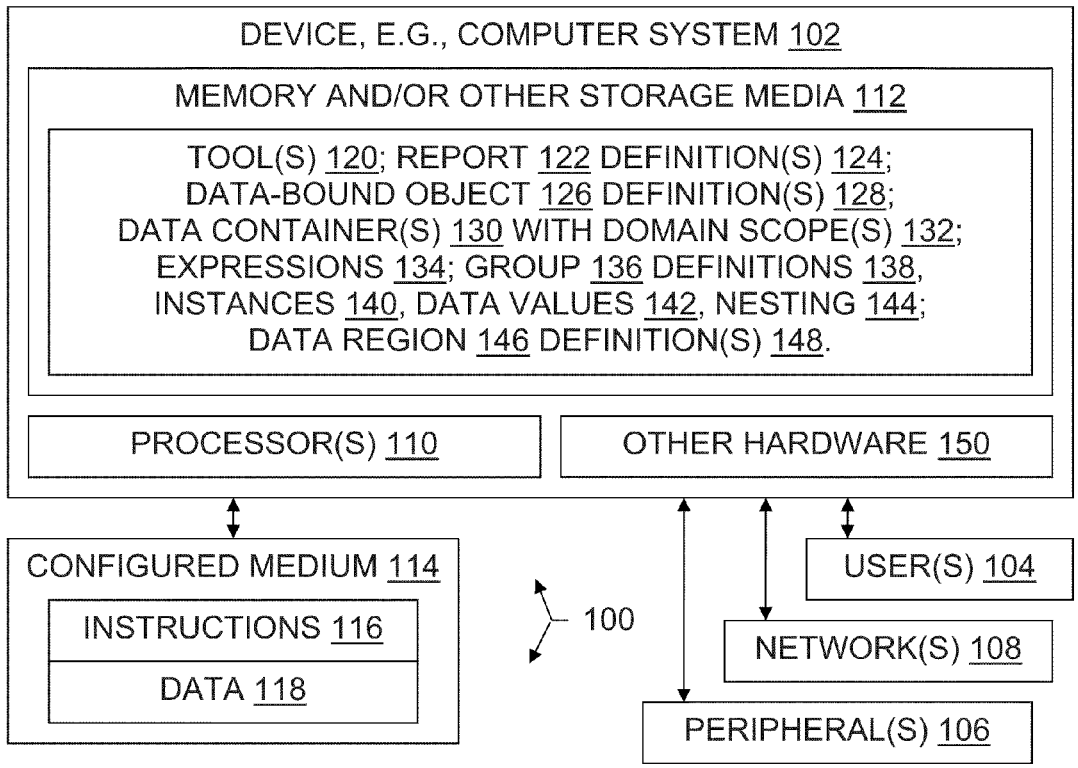
FIG. 1 is a block diagram illustrating a computer system having at least one processor, at least one memory, at least one tool for generating reports from report definitions, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, report developers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. The media 112 may be volatile memory, non-volatile memory, fixed in place media, removable media, magnetic media, optical media, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104. Media 112 may be of several different physical types, alone or in combination.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, key performance indicators, physical measurements, settings, images, readings, targets, volumes, and so forth. Such data is also transformed as discussed herein, e.g., by grouping, aggregate calculations, layout placement, synchronization, binding, deployment, execution, modification, display, creation, loading, and/or other operations.

Reporting tool(s) 120 help users 104 generate, store, retrieve, extract, aggregate, layout, display, visualize, and/or otherwise process the data used in reports 122. As discussed herein, a reporting service, report generator, or other tool 120 may be a previously familiar tool which fails to align data to make it readily actionable to a user consuming a report, or it may be a tool which has been supplemented and/or otherwise modified to support dynamic expansion of data calculation scope in accordance with the teachings herein. The mere presence of an item in FIG. 1, in particular, does not imply that every example of the item was previously known.

Reports 122 are defined in report definitions 124, using Microsoft® Report Definition Language (RDL) and/or another report definition mechanism. RDL specifies the following items: data-bound objects 126 and their respective definitions 128, data containers 130 having respective domain scopes 132, expressions 134, groups 136 and their respective definitions 138, group instances 140, data values 142, nesting 144 relationships between items, data regions 146 and their respective definitions. Examples of the foregoing, and of interrelationships between them, are available in RDL documentation, for instance. The same or similar items can also be specified using report definition mechanisms other than RDL.

Additional software, and items shown in the Figures, may reside partially or entirely within one or more media 112, thereby configuring those media. An operating environment may also include other hardware 150, such as buses, power supplies, and accelerators, for instance. Items shown in FIG. 1 are not necessarily part of every operating environment, and a given item in an embodiment may or may not interoperate with items in the operating environment shown.

Systems

Figure 2:
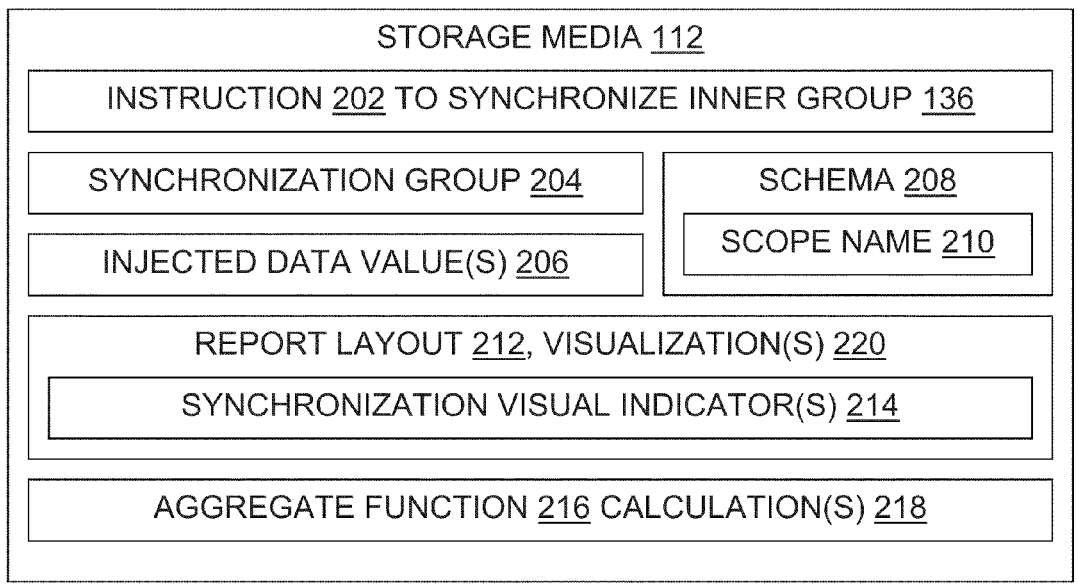
FIG. 2 is a block diagram illustrating aspects of dynamic expansion of data calculation scope using report definition synchronization instructions in an example architecture.

FIG. 2 illustrates an architecture which is suitable for use with some embodiments. An instruction 202 in a report definition 124 instructs an enhanced tool 120 to synchronize an inner group according to the teachings herein. Inner groups and outer groups are examples of groups 136; a particular role as an inner group or an outer group is specified by nesting 144 relationships in a particular report definition 124.

In some embodiments, a synchronization group 204 is a group that is not expressly defined as such in a report definition 124, but is instead dynamically created by a tool 120 to assist data alignment and/or otherwise dynamically expand data calculation scope as taught herein. Injected data values 206 are likewise not always expressly identified in a database underlying a report as part of the group they are placed in, but can instead be dynamically injected by a tool 120 to assist data alignment and/or to otherwise dynamically expand data calculation scope as taught herein.

In some embodiments, a synchronization instruction 202 can take a declarative form e.g., as a scope name 210 declared in a schema 208. Some embodiments provide a group scope name 210 in an RDL schema 208, which happens to be an XML schema. Schemas containing report definitions 124 may also be implemented using formats other than, or in addition to, XML.

In some embodiments, a report layout 212 can be generated by enhanced tools 120 from report definitions 124. When the report definition in question includes a synchronization instruction 202, the resulting report layout often includes synchronization visual indicators 214, such as whitespace, coordinated coloring, position alignments, and/or inserted data values. FIG. 5, for example, shows both whitespace and inserted data values (March and June in 2008; January, April, and May in 2009) used as synchronization visual indicators 214.

In some embodiments, an aggregate function 216 capable of handling synchronization is provided, configured such that inserted data values do not alter aggregate calculations 218. For instance, for the data shown in FIG. 5 Sales by Month in 2008 can be calculated by an enhanced tool as an average over four months even though six months are shown in the report 122, because inserted data values (March, June) are skipped by the enhanced averaging aggregate function.

Figure 3:
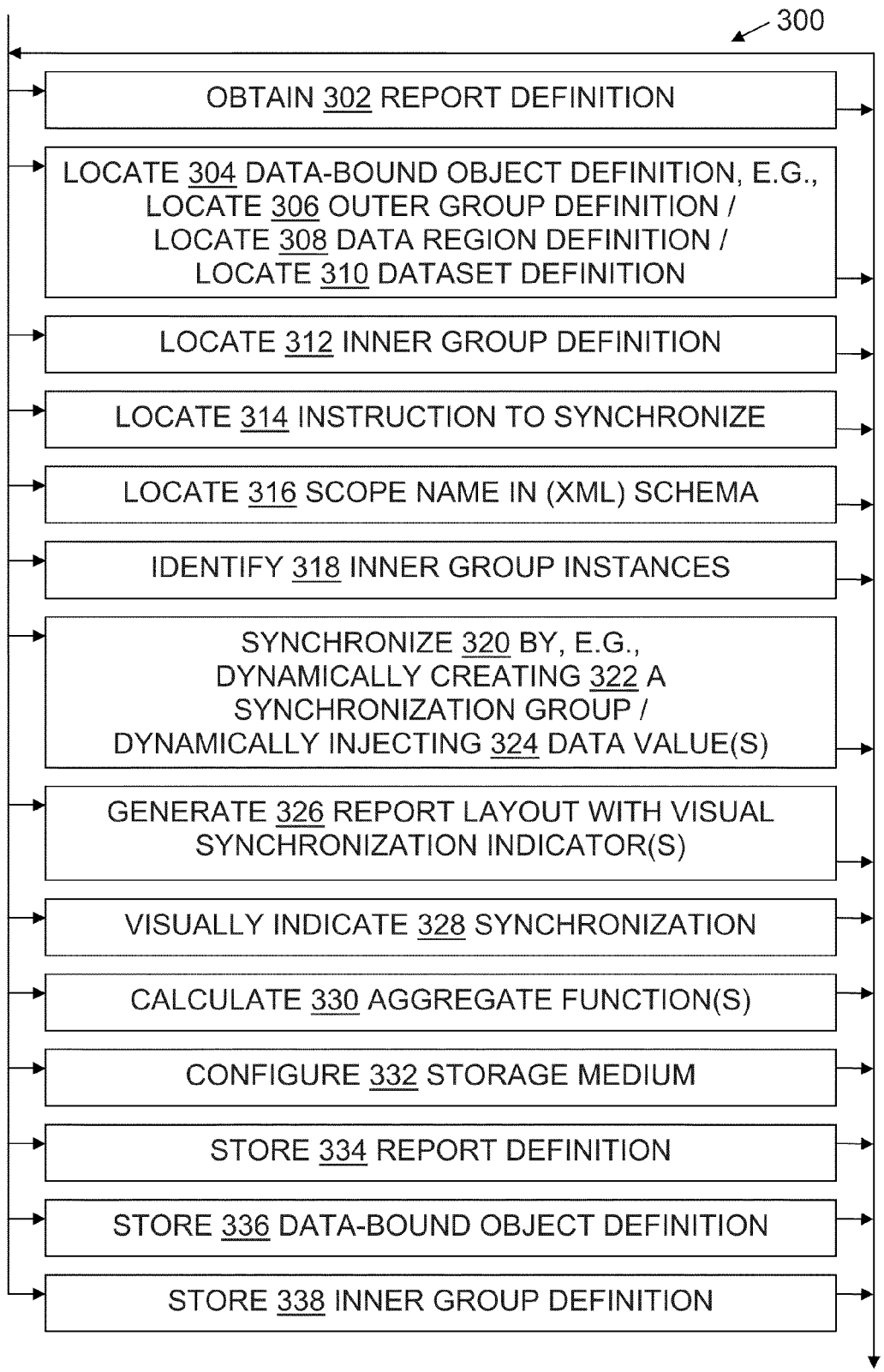
FIG. 3 is a flow chart illustrating steps of some method and configured storage medium embodiments.

With reference to FIGS. 1 through 3, some embodiments provide a reporting system which includes a computer system 102 with a logical processor 110 and a memory medium 112 configured by circuitry, firmware, and/or software to transform data calculation scope, and hence produce a tangible report which differs from reports that fail to expand scope, as discussed herein. The medium 112 may include at least one memory in operable communication with the logical processor(s).

In some embodiments, a report definition 124 residing in the memory(ies) includes an outer group definition 138 defining an outer group 136 having a domain scope 132. An inner group definition 138 defining an inner group 136 nested within the outer group is also in the report definition, as is an instruction 202 to synchronize the inner group across the outer group domain scope.

Some embodiments include a synchronization group 204, which is not expressly defined in the report definition, but is instead dynamically created by an enhanced tool 120 that processes the report definition. The synchronization group 204 may also be referred to as a hidden group or an artificial group. The synchronization group 204 is not expressly defined, in the sense that the data values in the group 204, and the need for the synchronization group 204 itself, depend not merely on group definitions 138 but also on what misalignments, if any, occur in a report layout 212 being generated from the report definition and the current data. Different data may lead to different synchronization group instance(s).

In some embodiments, the synchronization group is defined dynamically as containing at least all of the data values found in the inner group. In other embodiments, the synchronization group contains not only the data values actually found in the inner group but also all data values that are legal within the inner group, e.g., a synchronization group may contain all months even when only some of the months are actually used.

Some embodiments include a report generating tool 120 residing in the memory(ies) and configured to generate a report 122 based on the report definition 124. In some embodiments, for example, the tool 120 is enhanced to recognize synchronization instruction(s) 202, to dynamically create synchronization groups 204, to indicate synchronization visually in report layout(s) with whitespace or other indicators 214, and/or to skip data values inserted for visual alignment while calculating aggregate functions 216.

In some embodiments, synchronization is performed and the inner group being synchronized has no Parent expression defined in the report definition 124. In particular, some embodiments use an RDL Group.DomainScope element or similar instruction 202 to name a domain scope (e.g., data region or group) in which to evaluate group expressions. In some implementations, if this instruction 202 is omitted from a report definition, then the group expressions will be evaluated within the immediate parent's scope. If this instruction 202 is specified, then some implementations require that it be an ancestor scope. Some implementations only allow this instruction 202 if the group does not have a Parent expression. Some relevant use cases include tablix-centric constructs, e.g., to show a full employee hierarchy nested under each sales year, regardless of whether a sales person made sales during that year. Some implementations only allow this instruction 202 at the innermost group scope. In some implementations, lifting this restriction requires full ragged hierarchy support in layout rendering and data rendering.

In some embodiments, the system includes an aggregate function 216; some systems support calculating an aggregate function of an aggregate function value over a synchronized group, and calculation of the value is independent of data values injected by synchronization. That is, aggregates of aggregates only operate on top of real group instances; they ignore synchronization group 204 instances during their statistical calculations.

Note that "synchronization group 204" refers to a group which is at most implicitly defined in a report definition, and which is dynamically created by an enhanced tool 120 as an implementation aid to aligning data values in a report layout 212. By contrast, "synchronized group" refers to a group 136 that is expressly defined in the report definition, and whose missing values (values for which no current data is provided) may be among those injected into the layout from the synchronization group 204.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Methods

FIG. 3 illustrates some method embodiments in a flowchart 300. Methods shown in the Figures may be performed in some embodiments automatically, e.g., by an enhanced reporting tool 120 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a report definition obtaining step 302, an embodiment obtains a report definition 124 in a memory and/or other computer-readable storage medium 112. The report definition may be manually written by a developer, for instance, or it may be generated automatically by macros, scripts, and/or other software, or it may be authored in part manually and in part by machine. Step 302 may be accomplished in part using disk reads, network reads, and/or other data transfer mechanism(s), for example.

During a data-bound object definition locating step 304, an embodiment uses mechanisms of report definition parsing (such as syntactic and/or semantic analysis, and tree traversal) to locate in a report definition 124 a definition 128 of a data-bound object. Some examples of data-bound objects 126 include outer groups 136, data regions 146, and datasets. Accordingly, some embodiments include one or more of the following specific examples of locating step 304: locating 306 an outer group definition, locating 308 a data region definition, locating 310 a dataset definition.

During an inner group definition locating step 312, an embodiment uses mechanisms of report definition parsing (such as syntactic and/or semantic analysis) to locate in a report definition 124 a definition 138 of an inner group 136, namely, a group which is nested in a data-bound object.

During a synchronization instruction locating step 314, an embodiment uses mechanisms of report definition parsing (such as syntactic and/or semantic analysis, and tree traversal) to locate in a report definition 124 a synchronization instruction 202, namely, an instruction to dynamically expand a data calculation scope of an inner group. For example, some embodiments locate 316 a scope name 210 in an XML or other schema defining a report.

During an instance identifying step 318, an embodiment identifies instances 140 of an inner group 136. Step 318 is accomplished in some embodiments using data retrieval and report definition parsing.

During a synchronizing step 320, an embodiment synchronizes inner group instances to provide alignment of data values in a report layout. Synchronization may include, for example, dynamically creating 322 a synchronization group 204 and/or dynamically injecting 324 data value(s) 142 which are missing. A synchronization group 204 may serve as a template for identifying missing data values, by specifying all possible data values for an inner group—any of those possible values which are not found in a given instance are then injected 324 in the instance with null (e.g., shown as whitespace) content. In some embodiments, only the data values that are (i) missing from an instance X and (ii) used in at least one other instance, are injected into the instance X; such data values may be identified using a synchronization group which includes the union of all data values used, or identified by other mechanisms such as a pairwise comparison of instances. Sorts on synchronized inner groups (as opposed to an artificial synchronization group used to facilitate the sort calculation) may take into account the instances injected into synchronized groups.

During a layout generating step 326, an embodiment generates a report layout 212 containing synchronization visual indicators 214 to provide data value alignment. Such layouts visually indicate 328 synchronization by placing data values in alignment with values injected to fill semantic gaps, rather than simply placing data values adjacent one another as they are encountered in the current data.

During an aggregate function calculating step 330, an embodiment calculates a statistical or other function over an aggregation of data values which includes data value(s) injected 324 for alignment, without giving any statistical weight to the injected values.

During a memory configuring step 332, a memory medium 112 is configured by a synchronization instruction 202, synchronization group 204, injected 324 data value(s) 142, synchronization visual indicator(s) 214, and/or otherwise in connection with a dynamic data scope extension as discussed herein.

During a report definition storing step 334, an embodiment stores in a memory or other non-transitory medium 112 a report definition 124.

During a data-bound object storing step 336, an embodiment stores in a memory or other non-transitory medium 112 a data-bound object definition 128 defining a data container 130 having a domain scope 132. Step 336 may occur as part of report definition storing step 334, or subsequent to step 334. That is, a data-bound object definition 128 may be stored 336 as part of storing a surrounding report definition or may be stored 336 to enhance or modify a previously stored 334 report definition.

During an inner group definition storing step 338, an embodiment stores in a memory or other non-transitory medium 112 an inner group definition 138. Step 338 may occur as part of report definition storing step 334, or subsequent to step 334. That is, an inner group definition 138 may be stored 338 as part of storing a surrounding report definition or may be stored 338 to enhance or modify a previously stored 334 report definition.

To help illustrate terminology used in discussing the foregoing steps, consider FIGS. 4 and 5 again. In these examples, there is an outer group 136 named "Year", and an inner group 136 named "Month". Each of the data values (designated by 142 in FIG. 1) 2008, 2009 is individually an instance 140 of the outer group Year. Each of the data values January, February, March, April, May, June is individually an instance 140 of the inner group Month. 2008 is an instance of a Year group. The 2008 Year group instance contains a set {January, February, April, May} of four Month group instances 140. The 2009 Year group instance contains a set {February, March, June} of Month group instances 140. One possible outer group definition 138 is:

```
<Group Name = "Year">
    <GroupExpressions>
        <GroupExpression>=Fields!Year.Value</GroupExpression>
    </GroupExpressions>
</Group>
```

That is, the Year domain is defined by the group name and the group expression. One possible inner group definition is:

```
<Group Name="Month">
    <GroupExpressions>
        <GroupExpression>=Fields!Month.Value</GroupExpression>
    </GroupExpressions>
    <DomainScope>Tablix1</DomainScope>
</Group>
```

The DomainScope is defined in this specific example as Tablix1, which means the synchronization happens within the scope 132 of the entire data region Tablix1, which is the data-bound object (container) for the Year and Month groups in this example.

The foregoing steps and their interrelationships are discussed in greater detail below, in connection with various embodiments.

Some embodiments provide a process for defining a dynamic expansion of a data calculation scope, the process utilizing a device which has at least one logical processor 110 and a memory in operable communication with the logical processor.

This process includes obtaining 302 in the memory a report definition 124. Report definitions 124 can have multiple locations, including on-disk as file(s), and partially or entirely in random access memory. Report definitions 124 can also be represented in an object model form or as a binary serialization in a database, for example. Operations (obtaining, parsing, locating, etc.) performed on or with a report definition may thus be performed in one or more locations by one or more tools and with one or more representations of the report definition, but nonetheless together constitute a cohesive operation for the purposes of this document.

This process also includes locating 304 within the report definition, by operation of the processor(s), a data-bound object definition 128 defining a data container 130 having a domain scope 132. Some examples of data containers include outer groups, data regions, and datasets.

This process also includes locating 312 within the report definition, by operation of the processor(s), an inner group definition 138 defining an inner group nested within the data container 130.

This process also includes locating 314 within the report definition, by operation of the processor(s), an instruction 202 to synchronize the inner group across the data container 130 domain scope 132.

In some embodiments, an instruction 202 to synchronize can be a Group.DomainScope element <DomainScope>Tablix1</DomainScope>, for example. More generally, some embodiments use mechanism(s) by which synchronization is expressed in a declarative way in an RDL file or another report definition.

In some embodiments, the domain scope can be any scope that is higher in a report definitions hierarchy than the current (inner) group definition. Some possible containers 130 include outer groups 136, data regions 146 (e.g., Tablix, List, Table, Matrix, Chart, CustomReportItem), and datasetscopes. A data region is bound to a dataset from which data originates. A dataset is typically defined by a connection string to a data source and a command text that defines what data source query to execute to obtain data. Datasets are not limited to relational or other database data sources; datasets can also be XML data, multi-dimensional data, tree and other hierarchical data, and/or unstructured data.

In some embodiments, one special case occurs when the container 130 is an outer group. That is, the process includes locating 306 as the data-bound object definition an outer group definition 138 defining an outer group as the data container having the domain scope 132. The inner group definition defining the inner group is located 312 nested within the outer group. The instruction 202 to synchronize is located 314 in the form of an instruction to synchronize the inner group across the outer group domain scope.

In some embodiments, the process includes locating 308 as the data-bound object definition a data region definition 148 defining a data region as the data container having the domain scope 132. The inner group definition defining the inner group is located 312 nested within the data region. The instruction 202 to synchronize is located 314 in the form of an instruction to synchronize the inner group across the data region domain scope. This is another special case, in which the container is a data region.

In some embodiments, the process includes identifying 318 at least two instances 140 of the inner group, the instances differing in at least one data value and hence misaligned. In the FIG. 5 example, the process could identify 318 the 2008 instance which has values January, February, April, May, and could identify 318 the 2009 instance with values February, March, June. This process also includes synchronizing 320 the inner group instances based on the data container domain scope. In the FIG. 5 example, the process provides a report layout using January, February, March, April, May, and June in both the 2008 instance and the 2009 instance.

In some embodiments, the synchronizing step 320 includes dynamically creating 322 a synchronization group 204 in the data container 130 having the domain scope specified by the synchronization instruction 202. The synchronization group 204 in some embodiments contains at least all data values found in the inner group.

In some embodiments, the synchronizing step 320 includes dynamically injecting 324 into at least one inner group instance 140 at least one data value 142 from the data container domain scope 132, in order to fill in data value(s) missing from the instance(s). Such embodiments may be viewed as focusing on alignment as a synchronization result, since they do not necessarily require using a synchronization group 204. For example, one could synchronize the date axis of repeated charts inside an outer data region, based on the full date range available in the outer data region or the original dataset.

Some embodiments include generating 326 a report layout 212 in which synchronization 320 based on the data container domain scope 132 is visually indicated 328 by whitespace in a visualization 220. A synchronized report may show empty cells in tables, empty space in charts, and so forth, to provide alignment. Some examples of visualizations that may be enhanced to reflect alignment include tables, charts, and lists. Microsoft® Reporting Services technology offers chart, gauge, map, and state indicator (Key Performance Indicator) visualizations 220. Table, list, cross-tab (matrix), and tablix are text-oriented visualizations 220. An extensibility mechanism in the Reporting Services platform also allows third parties to offer additional data visualization 220 capabilities.

Some embodiments include calculating 330 an aggregate function 216 over a synchronized group without regard to data value(s) injected 324 by synchronization. In these embodiments, synchronization does not change the numeric results of aggregate functions.

Some embodiments include locating 314 within the report definition an instruction 202 to synchronize the inner group across the data container domain scope. Some embodiments locate 314 in an XML schema 208 a name 210 of a scope 132 in which to evaluate an inner group expression.

It will be understood that although RDL is an XML format, a Microsoft Reporting Services implementation has a publishing process that happens only the first time the report is uploaded on the server, and that the publishing process validates and transforms the RDL XML format into an internal compact object model called "Report Intermediate Format". When a report 122 is generated (a.k.a. "executed"), all calculation operations interact with the object model only, including also locating groups with DomainScope specified. Accordingly, one part of a process taught herein may operate on XML and another may operate an object model representation, while the operations as a whole nonetheless operate as part of a cohesive whole to generate aligned reports as taught herein.

In one embodiment which uses RDL, a new Group.DomainScope element (property) is added to RDL schemas 2010/01 and later. The Group.DomainScope element specifies the name of the scope (data region or group) in which to evaluate the group expressions. The Group.DomainScope element is optional in this embodiment and must not be specified more than once. If the Group.DomainScope element is specified, it is of type String. The parent element of the Group.DomainScope element is Group. The following is an XML Schema definition of the Group.DomainScope element:

<xsd:element name="DomainScope" type="xsd:string" minOccurs="0"/>

In one embodiment, the Global.DomainScope defines a container with a nested inner group. Once defined, group expressions are evaluated against the Global.DomainScope. In some embodiments, the Global.DomainScope capability is useful in creating a report layout with equal fields independent of actual values, e.g., null values may be inserted into a data set.

Some embodiments obtain 302 in a memory a report definition 124. They locate 304 within the report definition a data-bound object definition 128 defining a data container 130 having a domain scope 132, and locate 312 within the report definition an inner group definition 138 defining an inner group 136 nested within the data container. They identify 318 at least two instances 140 of the inner group, the instances differing in at least one data value. Then they synchronize 320 the inner group instances based on the data container domain scope. Finally, these embodiments generate 326 a report layout 212 in which synchronization based on the data container domain scope is visually indicated 328. Some of the foregoing steps may overlap in time.

In some embodiments, synchronizing 320 includes dynamically creating 322 a synchronization group 204 in the data container, and the synchronization group contains a predetermined set of data values 142, based on a definition of the data container 130. In generating a report, these embodiments look to the outer group or other container 130 for valid synchronization group 204 values 142, and include all valid values whether they happen to be used or not in the current report. In some embodiments, the synchronization group would contain all twelve months, not just the ones actually used in the data source. For example, U.S. patent application Ser. No. 12/394,066 filed 27 Feb. 2009 and incorporated herein by reference discusses filling data gaps and handling uncategorized data, which can predefine certain data buckets (such as January, February, . . . , December) for use in combination with Group.DomainScope capabilities discussed herein. In some embodiments, a synchronization group cannot contain group instance values that don't exist in the underlying data source—the group doesn't make additional values on its own. Some embodiments allow synchronization group 204 data values to be determined by dynamically forming a set (union) of the data values actually used in a particular report. Such a synchronization group 294 would contain only the values January, February, March, April, May, June in the FIG. 5 example.

Some embodiments visually indicate 328 synchronization based on the container domain scope by using at least one of the following in a generated report 122: an alignment whitespace entry, a color synchronization for a particular category across multiple charts, an empty data point marker. The foregoing list is not exhaustive, and is not comprehensive; it is merely exemplary.

Visual clues may indicate 328 that synchronization occurred. For synchronization across different charts, the visual clues may include aligned chart categories (e.g., columns, bars), which could mean that as part of the alignment whitespace is injected for those categories in the chart plot area. Visual clues may also include color synchronization for the same categories across different charts, and/or empty data point markers to represent injected categories. For tablix (crosstab, table) examples, injected 324 group instances may consume layout space the same way as regular group instances. However calculations in the context of injected group instances in a tablix don't have underlying data rows for the calculation; the visual effect is that those calculation cells are empty, but aggregate function calculations 330 ignore the injected instances.

In some embodiments, synchronization groups 204 are one possible implementation example, namely, one way to achieve alignment. A distinction can be made between the injected group instances at runtime (which do have layout), and a synchronization groups (artificial group) definition that is auto-generated by the tool 120 and only used temporarily to facilitate the synchronization calculations at runtime. The artificial group is auto-generated, so the typical user (e.g., a report author or other end-user) won't know that synchronization groups exist. Synchronization groups provide one way of implementing this group synchronization in a Reporting Services calculation engine or other tool 120. Other implementation alternatives may also be used. In one implementation, synchronization groups are only used temporarily to facilitate the synchronization calculations, and are hidden from the rest of the system, e.g., ignored for the purposes of report publishing validations, or layout calculations.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as synchronization instructions 202, synchronization groups 204, synchronization visual indicators 214, enhanced visualizations 220, and aligned report layouts 212 and reports 122, in the form of data 118 and instructions 116, read from a removable medium 114 and/or another source such as a network connection, to form a configured medium. The configured medium 112 is capable of causing a computer system to perform method steps for transforming data through dynamic scope expansion as disclosed herein. FIGS. 1 through 10 thus help illustrate configured storage media embodiments and method embodiments, as well as system and method embodiments. In particular, any of the method steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Some embodiments extend the data grouping mechanism in SQL Server® Reporting Services tools by dynamically creating a hidden synchronization group 204 under a scope 132 that is to be the basis on which an inner group should be synchronized (SQL SERVER is a mark of Microsoft Corporation). The dynamically created group 204 is processed the same as other defined groups, with respect to layout validations during the report publishing step. Once the instances are generated for this group at runtime, they are used to inject the missing instances to the inner group. To define scope expansion for an inner group, an ancestor scope that is to be the basis on which the inner group will be synchronized is defined.

In particular, a DomainScope element is introduced, as a new element in RDL, e.g.:

```
<Group Name="Month">
    <GroupExpressions>
    <GroupExpression>=Fields!Month.Value</GroupExpression>
    </GroupExpressions>
    <DomainScope>Tablix1</DomainScope>
</Group>
```

In this example, DomainScope specifies the ancestor scope based on which a group Month should be synchronized.

Some embodiments conform with some or all aspects of the following "Design specifications for Domain Scope". Those of skill will understand that these implementation details pertain to specific code, and thus need not appear in every embodiment. Those of skill will also understand that identifiers and some other terminology used in discussing these details are implementation-specific and thus need not pertain to every embodiment. Nonetheless, although they are not necessarily required to be present here, these details are provided because they may help provide context and/or may illustrate a few of the many possible implementations of the technology discussed herein.

With regard to Publishing, during a Phase 1 the following happens: Parse the new (DomainScope) property for the grouping; Perform validation possible at this phase; Add the group with domain scope defined to the new collection in Report Publishing m_domainScopeGroups.

During a Phase 2 the following happens: Add to the Automatic Subtotal phase the Domain scope handling, such that for each group with DomainScope defined the tool performs possible validations for this phase, and retrieves the target domain scope and adds to it the necessary grouping as well as the appropriate cells/rows. All DataRegion constructs implement a new Interface IDomainScopeMemberCreator for this purpose. Map ignores the domain scope in some implementations.

During a Phase 3 the remaining validations are performed.

Some implementations involve one or more of the following: Adding new property DomainScope to the group; Adding new property OriginalCount to HierarchyNodeList to exclude the DomainScope members; Ensuring that each DataRegion/ReportHierarchyNode serializes the count of its children domain scope members to be used by Tablix processing to identify the members that need DomainScope processing; Ensuring that GaugePanel/GaugeMember/GaugeRow serializes all the member hierarchy. In some implementations, a new reference is added in the ODPContext for a new class DomainScopeContext.

With regard to Tablix Processing, in some implementations, some or all of the following points apply. As to a Sort and Filter Phase, at the beginning of this phase a new instance of DomainScopeContext is created and added to the ODPContext. For each RuntimeDataTablixObj as well as each RuntimeDataTablixGroupLeafObj: for each artificial domain scope child members, the reference to its RuntimeGroupRootObj is added to a dictionary in the DomainScopeContext. For each RuntimeGroupRootObj which has a domain scope defined: retrieve from the ScopeDomainContext the reference to the target domain scope. For each hierarchy obj in the target RuntimeGroupingObj, add its key(s) to the DomainScopeConText as well as the first row of the group leaf. Call NextRow on the destination RuntimeGroupRootObj, which will pick the key(s) from the context to create the group instance and add it to the grouping. In some implementations, the Member collections for all data regions return the OriginalCount to hide the artificial members created for domain scope. In some, one or more of these restrictions apply: Domain scope is not allowed with a group with Parent defined; Domain scope is not allowed with a detail group; DataSet is not allowed as a Target Domain Scope; Target Domain Scope must be an ancestor of the group; Domain Scope is not allowed for non-leaf grouping.

Some design considerations include the following: Whether to allow Target Domain Scope to have Parent defined; Whether to remove the otherwise unnecessary cells/rows created for the artificial grouping.

In some embodiments, usecases for sparklines include synchronization of individual charts/gauges nested within a higher scope. Some examples include synchronizing x-axis/y-axis min and max values (accomplished via aggregation, and aggregates of aggregates), and synchronizing categories, series, legend (that is, identical category group values, sort order, even if for a particular sparkline instance not all categories are present in the data). The latter usecases for syncing grouping information raise various possibilities. In some embodiments, as a general enhancement a grouping feature allows one to evaluate a group's group expressions virtually at a higher, ancestor scope and apply all those group instances to fill gaps as needed for alignment at the scope where the group is specified.

Figure 8:
FIG. 8 is a screenshot diagram illustrating a synchronized report layout visualization, including sparklines aligned along an X-axis.

FIG. 8 shows an example visualization 220. Note the aligned categories and x-axis of the mini-bar charts (sparklines) nested in the tablix, despite the fact that only sparse sales data is available to reporting tool.

FIG. 9 shows an example including a general tablix with regular nested grouping. FIG. 10 shows the FIG. 9 tablix enhanced by data scope expansion, with Quarter-Group using DomainScope=Tablix1 and thereby ensuring the same quarter values are present in all nested quarter groups at runtime. Note that in this example Count returns 0; most other aggregate functions 216 such as Sum return Null, because there are no corresponding rows for those particular group instances that were filled in.

With respect to some implementations, the following observations may also be helpful. Again, these details are not necessarily required but are offered for whatever context or illustrative value they may have.

As to Publishing and the implementation details noted above, a basic idea in some implementations is to generate artificial group 204 definitions (by cloning the original group with group expression, but without sort/filter etc.) directly under the specified DomainScope as a peer to already present groups in RDL. Note that the original group definitions stay in place as well. Artificial groups 204 don't have any layout, even in matrix layouts. They become special groups that are ignored for layout calculations and validations in publishing. This introduces special cases for publishing and processing, but in the end can reduce or eliminate the work of generating artificial data points in charts and other data region types.

As to RenderingObjectModel, in some implementations artificial groups 204 are hidden in the RenderingObjectModel, so that consumers such as DV mapping layers and renderers don't know about them.

As to Tablix Data Processing, in some implementations tablix data processing is tweaked to account for artificial groups 204. A tablix processing phase 1 (grouping) may remain unchanged, except to flag groups that have DomainScope !=null to require a second phase, even if there is no sort/filter. Note that artificial groups 204 are populated in parallel with the original nested groups. At the end of phase 1, the artificial group will contain all possible instance values, while all the original nested groups will only contain the group instance values within their specific hierarchy. Also note that pre-sort aggregate calculations in phase 1 remain unchanged. A tablix processing pre-phase 2 (peer group processing) or phase 2 (sort & filter) may be enhanced to fill in missing group instances from the artificial group 204 into the original group scopes as needed for alignment. This either happens before phase 2, or is folded inline into phase 2 with sort and filter. The actual sort and filter expressions take into account the already filled-in artificial group instances. One may also consider a case similar to example of FIGS. 9 and 10, with dynamic sorting, e.g., someone wants to sort the quarters ascending under USA, but descending under Canada.

As to aggregates of aggregates, in some implementations aggregates of aggregates only operate on top of real group instances; these functions 216 ignore artificial group 204 instances that were filled in phase 2.

In some implementations, memory/performance optimization includes using a sparse persisted group tree in case of groups with domain scopes; one can also implement Group-.DomainScope without persisted group trees. This optional optimization can be applied if the original group with domain scope does not have sort or filter. In that case, the tool would not materialize the filled-in (empty) group instances in the persisted group tree, but instead resolve those on-the-fly during on-demand processing, including calculating aggregates on-demand as needed.

In some implementations, an enhanced tool 120 user interface includes mechanisms for generating synchronization instructions 202. For example, a Tablix Member menu may include an expandable Group item, which can be expanded to show properties of Groups that include DataElementName, DataElementOutput, and so on. In particular, DomainScope shows up as a Group property, so a scope such as Country, for example, can be selected. A user interface screen in some implementations also shows Series Group Properties, with a screen to Change series group settings. The user enters a Name (e.g., Sparkline3_SeriesGroup6), a label (e.g., [Country]), and a domain scope to Synchronize groups in (e.g., Tablix1). A user interface screen in some implementations also shows a screen to Configure the horizontal axis options. The user selects an Axis type (e.g., Category), and an Axis range and interval (e.g., Align axes in Tablix4).

As noted, in some embodiments, data values are injected during synchronization. FIGS. 5 and 7 implicitly insert such missing data instances in a particular sort order, because so-called sort expressions defined on groups explicitly take into account those injected group instance values when calculating the sort. In some embodiments, aggregate functions are aware of injected group instances for the purpose of calculations. Similarly, sorts applied on particular groups are aware of and take into account those injected values. If no sort is applied, the injected values appear at the end of the list of group instance values.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for defining a dynamic expansion of a data calculation scope, the process utilizing a device which has at least one logical processor and a memory in operable communication with the logical processor, the process comprising:
    obtaining in the memory a report definition;
    by operation of the at least one processor:
        locating within the report definition a data-bound object definition defining a data container having a domain scope;
        locating within the report definition an inner group definition defining an inner group nested within the data container; and
        locating within the report definition an instruction to synchronize the inner group across the data container domain scope; and
        in response to receiving a request to synchronize the inner group across the data container domain scope:
            identifying at least two instances of the inner group, the instances differing in at least one data value;
            synchronizing the at least two instances of the inner group based on the data container domain scope; and
            generating a report layout in which the synchronization is visually indicated.

2. The process of claim 1, further comprising:
    locating as the data-bound object definition an outer group definition defining an outer group as the data container having the domain scope;
    locating the inner group definition defining the inner group nested within the outer group; and
    locating as the instruction to synchronize an instruction to synchronize the inner group across the outer group domain scope.

3. The process of claim 1, further comprising:
    locating as the data-bound object definition a data region definition defining a data region as the data container having the domain scope;

locating the inner group definition defining the inner group nested within the data region; and
locating as the instruction to synchronize an instruction to synchronize the inner group across the data region domain scope.

4. The process of claim 1, wherein synchronizing comprises dynamically creating a synchronization group in the data container, the synchronization group containing at least all data values found in the inner group.

5. The process of claim 1, wherein synchronizing comprises dynamically injecting at least one inner group instance with at least one data value from the data container domain scope to fill in at least one data value missing from the at least one inner group instance.

6. The process of claim 1, wherein the visual indication is a whitespace visualization.

7. The process of claim 1, further comprising calculating an aggregate function over a synchronized group without regard to at least one data value injected by synchronization.

8. The process of claim 1, wherein locating within the report definition an instruction to synchronize the inner group across the data container domain scope comprises locating in an XML schema a name of a scope in which to evaluate an inner group expression.

9. A reporting system comprising:
at least one logical processor;
at least one memory in operable communication with the at least one logical processor; and
a report definition residing in the at least one memory, the report definition including an outer group definition defining an outer group having a domain scope, an inner group definition defining an inner group nested within the outer group, and an instruction to synchronize the inner group across the outer group domain scope, wherein the instruction to synchronize the inner group across the outer group domain scope causes the at least one logical processor to:
identify at least two instances of the inner group, the instances differing in at least one data value;
synchronize the at least two instances of the inner group based on the data container domain scope; and
generate a report in which the synchronization is visually indicated.

10. The system of claim 9, further comprising a report generating tool residing in the at least one memory and configured to generate the report based on the report definition.

11. The system of claim 9, wherein the inner group has no parent expression defined in the report definition.

12. The system of claim 9, wherein the inner group is located at an innermost nesting level defined in the report definition.

13. The system of claim 9, further comprising an aggregate function of aggregate function value over a synchronized group, the value independent of data values injected by synchronization.

14. The system of claim 9, further comprising a synchronization group which is not expressly defined in the report definition, the synchronization group defined as containing at least all data values found in the inner group.

15. A computer-readable storage medium configured with data and with instructions to perform a process for defining a hidden group under a specified scope, the process utilizing a device which has at least one logical processor and a memory in operable communication with the logical processor, the process comprising:
storing in the memory a report definition;
by operation of the at least one processor:
storing within the report definition, a data-bound object definition defining a data container having a domain scope;
storing within the report definition, an inner group definition defining an inner group nested within the data container; and
in response to receiving a request to synchronize the inner group across the data container domain scope:
identifying at least two instances of the inner group, the instances differing in at least one data value;
synchronizing the at least two instances of the inner group based on the data container domain scope; and
generating a report layout in which the synchronization is visually indicated.

16. The computer-readable storage medium of claim 15, further comprising instructions for:
prior to identifying at least two instances of the inner group, obtaining in a memory a report definition;
locating within the report definition a data-bound object definition defining a data container having a domain scope;
locating within the report definition an inner group definition defining an inner group nested within the data container.

17. The computer-readable storage medium of claim 15, wherein synchronizing comprises dynamically injecting the inner group instances with at least one data value from the data container domain scope to fill in at least one data value missing from the instances.

18. The computer-readable storage medium of claim 15, wherein the process comprises calculating an aggregate function over a synchronized group without regard to group the at least one data value injected by synchronization.

19. The computer-readable storage medium of claim 15, wherein the process comprises locating within an XML report definition an instruction to synchronize the inner group across an outer group domain scope.

20. The computer-readable storage medium of claim 15, wherein the process comprises visually indicating synchronization based on the container domain scope by using at least one of the following in a generated report:
an alignment whitespace entry;
a color synchronization for a particular category across multiple charts;
an empty data point marker.

* * * * *